Figure 1:
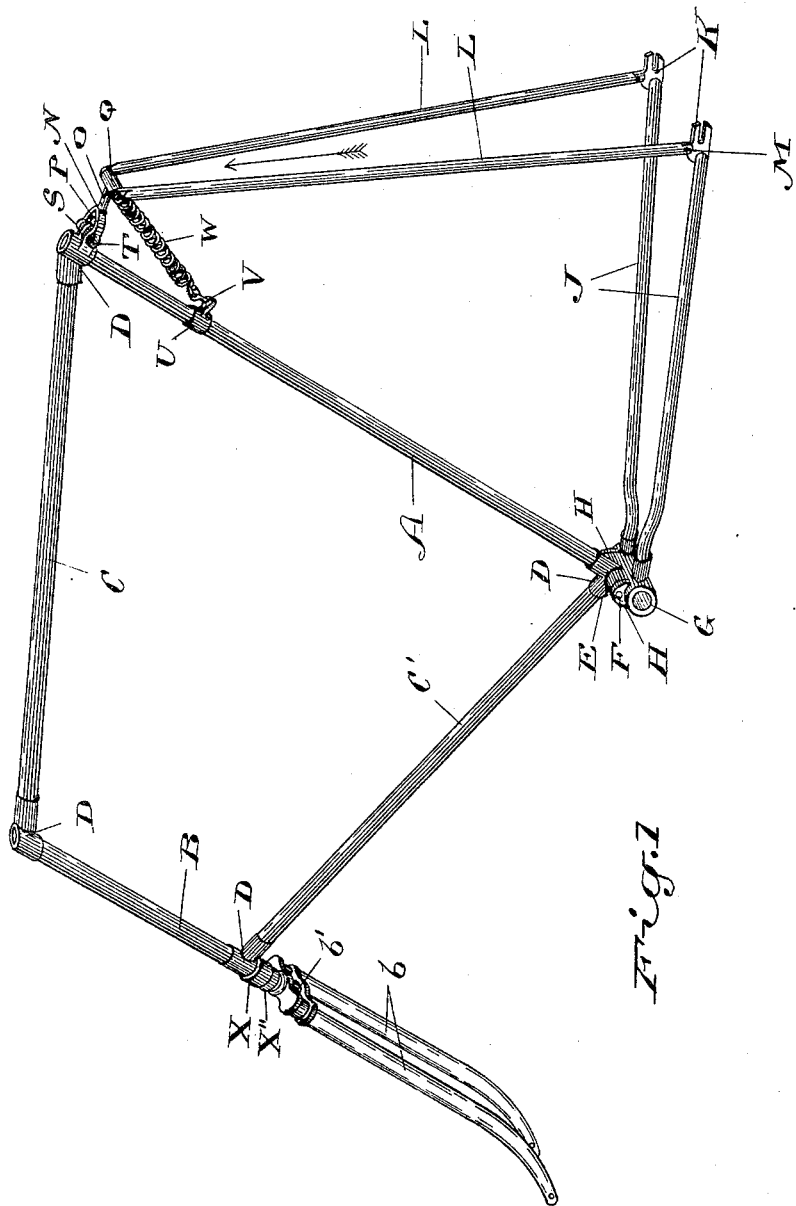

No. 630,232. Patented Aug. 1, 1899.
J. HUGHES & B. IBBOTSON.
FRAME FOR BICYCLES, &c.
(Application filed Mar. 17, 1898.)
(No Model.) 2 Sheets—Sheet 1.

Witnesses
Inventors
Jas Hughes
B Ibbotson
by C. H Rules
their attorney

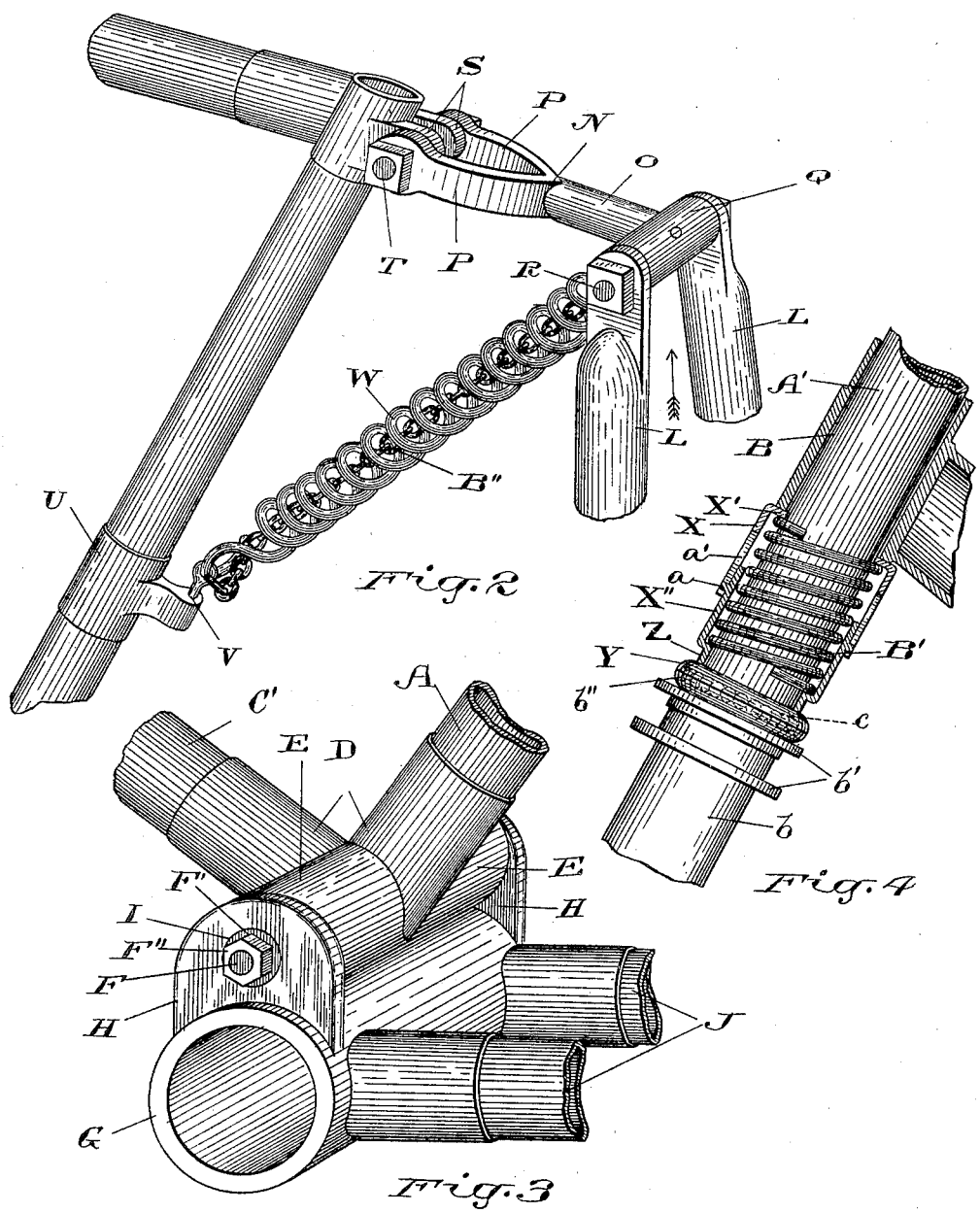

UNITED STATES PATENT OFFICE.

JOSEPH HUGHES AND BENJAMIN IBBOTSON, OF TORONTO, CANADA.

FRAME FOR BICYCLES, &c.

SPECIFICATION forming part of Letters Patent No. 630,232, dated August 1, 1899.

Application filed March 17, 1898. Serial No. 674,283. (No model.)

*To all whom it may concern:*

Be it known that we, JOSEPH HUGHES and BENJAMIN IBBOTSON, of the city of Toronto, in the county of York and Province of Ontario, Canada, have invented certain new and useful Improvements in the Frames of Bicycles and other Foot-Propelled Vehicles; and we hereby declare that the following is a full, clear, and exact description of the same.

This invention relates to certain new and useful improvements in the frames of bicycles and other foot-propelled vehicles, and relates more particularly to the peculiar manner in which the crank-axle bracket is attached to the lower end of the standard of the frame and to the lower side bars and the manner in which the upper side bars are connected to the upper part of the standard and to the rear ends of the lower side bars; and the invention also relates to the manner in which the standard of the front forks is fitted to the head of the frame.

During the progress of a bicycle or other foot-propelled vehicle over rough or uneven surfaces the frame is subjected to a vibratory motion, which is injurious both to the vehicle and the rider and is especially noticeable in vehicles fitted with rigid frames. The front forks are constantly subjected to breaking strains of considerable force during the ordinary usage of a bicycle by the wheel forcibly meeting immovable objects of sufficient size and resisting force to arrest or partially arrest its progress, and in the event of the rider propelling the wheel at a rapid rate of speed and meeting an obstacle of this description it frequently happens that the front forks break at the crown or intermediate the crown and the bearings for the axle become bent to such an extent as to render the vehicle useless. Instances have also been known where the reach-bars of the frame have been broken and other instances where they have been bent from such concussion to such an extent as to render the vehicle useless. To overcome these objections—that is, to relieve the rider of all controllable vibratory motion and to so arrange the frame as to relieve the vehicle of practically all liability of breakage through meeting an immovable resisting obstacle—is one part of the object of the present invention, while the other part of the object of the invention is to so arrange the parts of the frame that it will have all the advantages of a rigid frame, as well as of a yielding resilient frame, as hereinafter set forth, and more particularly pointed out in the claims.

In the drawings, Figure 1 is a perspective view of the complete wheel. Fig. 2 is a view showing the attachment of the spring-forks to the upper part of the standard. Fig. 3 is a view showing the attachment of the crank-axle bracket to the lower end of the standard. Fig. 4 is a view showing the construction of the head of the bicyle-frame and standard of the front forks.

Like letters of reference refer to like parts throughout the specification and drawings.

A represents the standard, B the head, and C C' the upper and lower reach-bars, respectively. These parts are united rigidly in the usual manner by couplings D.

The coupling D, uniting the lower end of the standard A and lower reach-bar C', is provided with a horizontal sleeve E, which contains a pivot-bolt F, projecting a slight distance beyond each end of the sleeve E.

G represents the crank-axle bracket, fitted with two upwardly-extending lugs H, the inner faces of which are remote from each other a distance equal to the length of the sleeve E. Each of the lugs H is provided with a bolt-hole I, through which extends the pivot-bolt F. When the crank-axle bracket is assembled in position, the lugs H embrace the ends of the sleeve E and the pivot-bolt F extends through the holes I. Fitted on the ends of the bolt F are nuts and washers F' F'', respectively, by means of which the lugs are locked to the ends of the sleeve E and the crank-axle bracket pivotally held to the lower end of the standard.

Rigidly connected to and projecting rearwardly from the crank-axle bracket G are the lower side bars J, the rear ends of which are fitted with the usual axle-plates K.

L L represent the upper side bars of the rear forks, the lower end of each of which is pivoted to its respective axle-plate K by means of a pivot-bolt M.

N represents a link embracing in its construction a shank O, terminating at its forward end in two forks P P and at its rear end in a horizontal sleeve Q. Passing through the upper ends of the upper side bars L and through the sleeve Q is a bolt R, by means of which the upper ends of the upper side bars are locked to the link. At the rear side of the coupling D, uniting the upper reach-bar to the top of the standard, is a horizontal sleeve S, and passing through the forks P P and sleeve S is a pivot-bolt T, by means of which the link N is pivotally fastened to the top of the standard.

U represents a collar fitted to the standard below the link N, and V represents a hook extending rearwardly from the collar.

W represents a spring connected to the sleeve Q of the link and to the hook V, the purpose of the spring being to hold these parts in their normal relative position when the weight is upon the vehicle, and to return the rear forks to their normal relative position after yielding to relieve the frame of the jarring motion.

The lower end of the head B is provided with a sleeve member X, having an annular flange X' of a slightly-greater diameter than the head of the front forks. Vertically movable within the lower end of the sleeve member X is a sleeve member X'', the lower end of which is fitted with a ball-cup Y. The sleeve member X'' above the ball-cup Y is fitted with an annular flange or shoulder Z. To prevent any revoluble or twisting motion on the part of the sleeve member X'', it is provided with diametrically opposite lugs $a$, which work in vertical slots $a'$ in the sleeve member X.

$b$ represents the front forks, united by a crown $b'$, the top of which is fitted with a ball-cup $b''$, corresponding in size and shape with the ball-cup Y. Interposed between the ball-cups Y and $b''$ are the usual antifriction-balls $c$ to minimize the friction of the turning of the forks.

A' represents the standard of the front forks, projecting through the ball-cup Y and sleeve members X'' X and the head B. Encircling the standard A' is a spring B', the ends of which bear against the flanges X' and Z to hold the front forks in their normal relative position to the head of the frame. When the front wheel meets an obstacle, the sleeve members telescope one into the other and partially relieve the frame of the force of the jar, the spring B' returning the front forks to their normal position as soon as the cause of the trouble has passed.

In passing over a rough or uneven surface the springs B' and W allow the front forks and rear forks to respond to the jarring motion to relieve the frame of its force and to return the parts to their normal position as soon as the cause of disturbance has passed. The action of the rear forks when passing an obstruction is in the direction indicated by arrows, and to provide for the side bars and chain swinging from the same center it is necessary to pivotally connect the crank-axle bracket to the lower end of the standard in the manner above described. By this means the sprocket-wheels on the crank-axle and driving-wheels swing from the same center, together with the chain and side bars, avoiding any liability of the chain binding on the wheels and causing a stoppage of the progress of the vehicle. The spring W draws the link and rear forks downward to their normal relative position when the cause of the trouble is over.

A frame constructed on this principle is relieved of practically all vibratory motion, and the rider can ride over the roughest or most uneven surfaces in as comparatively comfortable a manner as if riding on an asphalt pavement. Again, by providing the head of the forks with the spring connection in the manner described the danger of injury to the forks or reach-bars is to a large extent overcome. Again, by relieving the frame of the jolting or jarring sensation the parts are not worked loose, as in the case of a rigid frame, necessitating a tightening up of the same.

To limit the upward movement of the upper reach-bars and spring W, we provide a chain B'', connected to the link N and to the hook V.

Having thus fully described our invention, what we claim as new, and desire to secure by Letters Patent, is—

1. A bicycle-frame embracing in its construction the usual head, standard and reach-bars rigidly united, a horizontal sleeve rigidly connected to the standard at its junction with the lower reach-bar, a crank-axle bracket having two upwardly-projecting lugs, a pivot-pin passing through the lugs and sleeve to pivotally connect the crank-axle bracket to the standard, the lower side bars of the rear forks rigidly connected to the crank-axle bracket and adapted to move therewith, the upper side bars of the rear forks having their lower ends pivotally connected to the lower side bars, a link consisting of a horizontal sleeve and a shank terminating in a bifurcated end, a pivot-pin passing through the ends of the upper side bars and sleeve, a pivot-bolt passing through the bifurcated ends and through a lug projecting rearwardly from the coupling at the top of the standard, and a spring connected to the link and standard, substantially as specified.

2. A bicycle-frame embracing in its construction a head, a sleeve member depending from the head, having an annular flange, a movable sleeve member within the fixed sleeve member having an annular shoulder intermediate the top and bottom, a bearing-cup connected to the lower end of the movable sleeve member, the front forks, a standard for the front forks projecting through the head and sleeve members a ball-cup connected to the crown of the front forks in juxtaposition to the ball-cup of the movable sleeve, and antifriction-balls interposed between the ball-cups, substantially as specified.

Toronto, March 9, A. D. 1898.

JOSEPH HUGHES.
B. IBBOTSON.

In presence of—
C. H. RICHES,
J. E. CAMERON.